(12) United States Patent
Yu

(10) Patent No.: US 7,576,930 B2
(45) Date of Patent: Aug. 18, 2009

(54) LENS MODULE

(75) Inventor: Sheng-Jung Yu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/955,281

(22) Filed: Dec. 12, 2007

(65) Prior Publication Data

US 2008/0151398 A1 Jun. 26, 2008

(30) Foreign Application Priority Data

Dec. 22, 2006 (CN) .................... 2006 1 0157858

(51) Int. Cl.
*G02B 7/02* (2006.01)
(52) U.S. Cl. ...................................... 359/821
(58) Field of Classification Search .......... 359/819–824
See application file for complete search history.

(56) References Cited

U.S. PATENT DOCUMENTS

2004/0130808 A1 7/2004 Yoneyama et al.
2007/0154198 A1* 7/2007 Oh et al. ..................... 396/85

* cited by examiner

*Primary Examiner*—Ricky L Mack
*Assistant Examiner*—Vipin M Patel
(74) *Attorney, Agent, or Firm*—Frank R. Niranjan

(57) ABSTRACT

A lens module includes a seat supporting a first lens barrel and the second lens barrel thereon. The seat includes a body equipped with an electromagnet and two columns extending from the body. The first lens barrel includes a first sleeve equipped a lens therein. Two first arms extend from the sleeve and engage with the columns of the seat, respectively. The second lens barrel is equipped with a magnetic member corresponding to the electromagnet of the seat. The second lens barrel includes a second sleeve equipped a lens therein. Two second arms extend from the second sleeve and movably engage with columns of the seat. The electromagnet is configured for applying a magnetic force to the magnetic member to drive the second lens barrel to move between the seat and the first lens barrel.

11 Claims, 3 Drawing Sheets

LENS MODULE

BACKGROUND OF THE INVENTION

1. Field of the Invention

The present invention relates generally to lens modules, and particularly to a lens module with multi-step focuses.

2. Description of Related Art

With the development of the optical imaging technology, camera devices are becoming widely used in electronic devices, such as digital cameras and mobile phones.

A camera device generally has a focus structure, to capture images of an object with different magnifications. The focus structures of camera devices can be divided into two kinds of focus structure: an optical focus structure and an auto focus structure. The optical focus structure achieves different magnifications by a driving device thereof or by users driving a lens of a lens module of the camera device to a desired position. Generally, a space is required to move the lens and an image sensor in the camera device with the optical structure. In contrast, the auto focus structure focuses on an object by comparing the images of the object with the images on the image sensor. The image sensor is controlled by a processing unit installed inside the camera device. When it comes to obtain an image of the object, the processing unit magnifies the image in the image sensor. The auto focus structure is suitable for compact styles of camera devices. However, a problem accompanying auto focus camera devices is that the definition of the image is reduced when the image is magnified.

In order to cater for the compact style trend of the camera devices, and insure that clear magnified images can be obtained, a magnetic driving device is employed to drive a lens in a lens module of the camera device. Referring to US Patent Publication No. 2004/0130808 A1, a magnetic driving device in a lens module is illustrated. The magnetic driving device comprises an annular driving magnet attached to a periphery of a lens mounted on a movable member, and an immovable member equipped with a driving coil. When electrical current is given to the driving coil, the driving coil is activated and drives the movable member with the lens to move along the optical axis of the lens from a first position to a second position. However, images with different magnifications are highly demanded by users, the related camera device can not achieve multi-magnifications, therefore the camera device needs to be improved.

What is needed therefore is a lens module with multi-step focuses can provide multi-magnifications in use.

SUMMARY OF THE INVENTION

According to a present embodiment, a lens module comprises a seat supporting a first lens barrel and the second lens barrel thereon. The seat comprises a body portion equipped with an electromagnet and two spaced columns extending from the body portion. The first lens barrel comprises a first sleeve located between the two columns of the seat and equipped a lens therein. Two first arms extend from the sleeve and engage with the columns of the seat, respectively. The second lens barrel is located between the first lens barrel and the seat and is equipped with a magnetic member corresponding to the electromagnet of the seat. The second lens barrel comprises a second sleeve located between the two columns of the seat and equipped a lens therein. Two second arms extend from the second sleeve and movably engage with columns of the seat. The electromagnet is configured for applying a magnetic force to the magnetic member to drive the second lens barrel to move between the seat and the first lens barrel. Therefore, the lens module with multi-step focuses can give multi-magnifications of images.

Other advantages and novel features of the present invention will be drawn from the following detailed description of a preferred embodiment of the present invention with attached drawings, in which:

BRIEF DESCRIPTION OF THE DRAWINGS

Many aspects of the present lens module can be better understood with reference to the following drawings. The components in the drawings are not necessarily drawn to scale, the emphasis instead being placed upon clearly illustrating the principles of the present lens module. Moreover, in the drawings, like reference numerals designate corresponding parts throughout the several views.

DETAILED DESCRIPTION OF THE INVENTION

Figure 1:
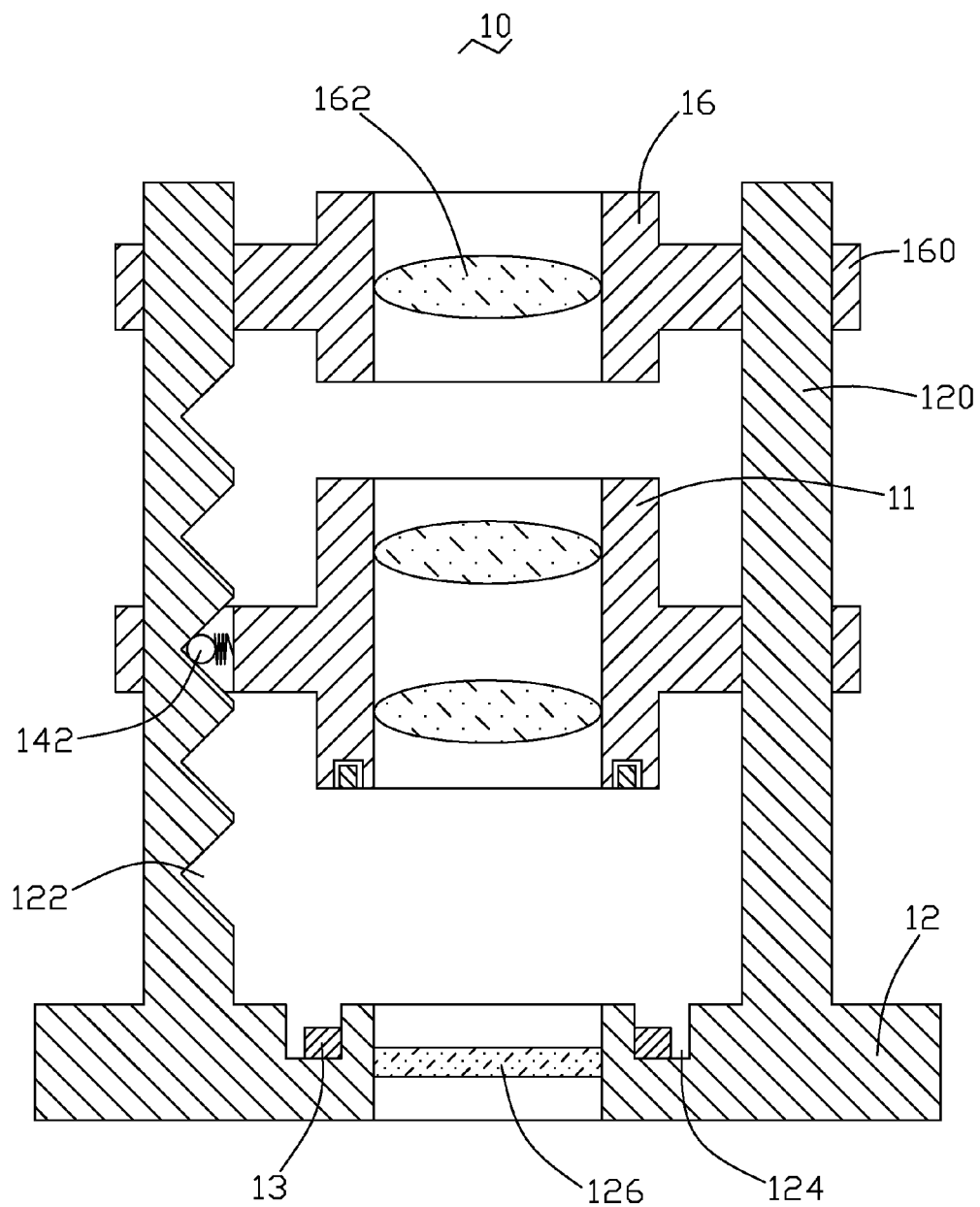
FIG. 1 is a schematic, cross-sectional view of a lens module in accordance with a first embodiment of the present invention.
Figure 2:
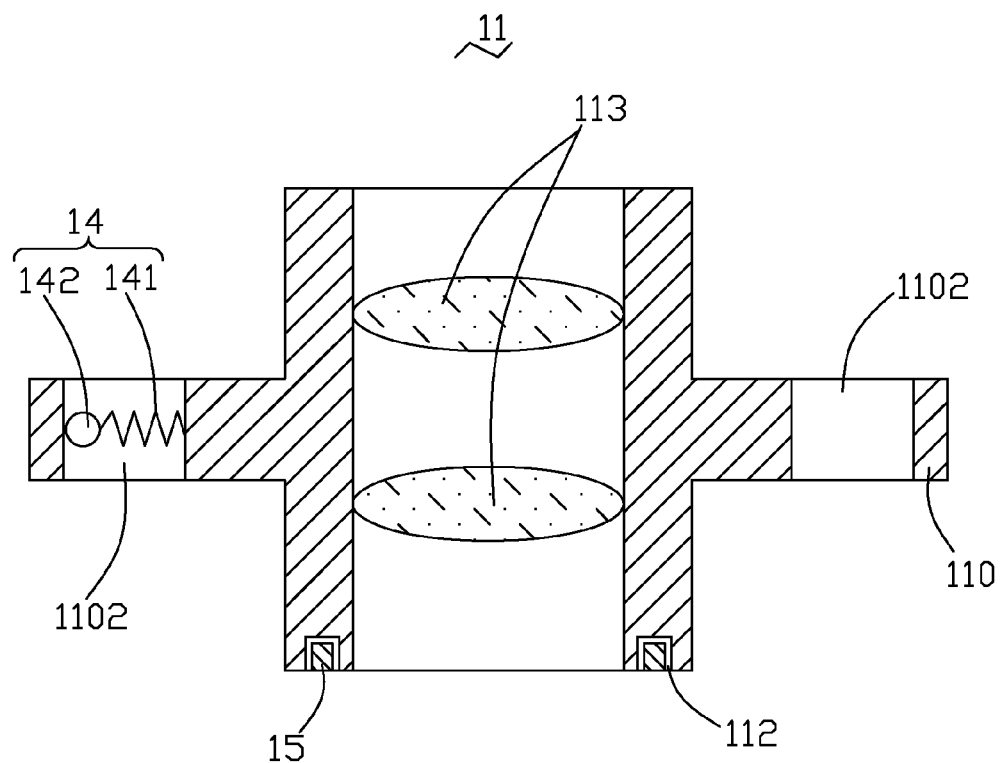
FIG. 2 shows a second lens barrel of the lens module of FIG. 1.

Referring to FIGS. 1 and 2, a lens module 10 in accordance with a first embodiment of the present invention is illustrated. The lens module 10 comprises a first lens barrel 16, a second lens barrel 11 movable relative to the first lens barrel 16, a seat 12 supporting the first lens barrel 16 and the second lens barrel 11.

The seat 12 comprises a cylindrical body (not labeled) and two spaced guiding columns 120 extending upwardly from the body. The two columns 120 are parallel to each other and symmetrical about an axis of the body. An image sensor 126 is equipped in a central portion of the body between the two columns 120. Between the two columns 120, the body defines two first nests 124 at two opposite sides of the image sensor 126, respectively. Each first nest 124 is exposed to a space above the body and contains an electromagnet 13 therein. One of the two columns 120 has a sawtooth structure in an inner side facing toward the other one of the two columns 120, thereby defining a plurality of V-shaped recesses 122 between two ends thereof. Alternatively, in another embodiment, the two columns 120 both define recesses 122 therein.

The first lens barrel 16 is equipped with the columns 120 of the seat 12, and is located adjacent to upper ends of the columns 120. The first lens barrel 16 comprises a cylindrical first sleeve (not labeled), and a first lens 162 equipped in the first sleeve. Two opposite first arms 160 extend outwardly from a middle portion of a periphery of the first sleeve. The two first arms 160 are symmetric about an axis of the first sleeve. Each first arm 160 defines a through positioning hole (not shown) adjacent to a distal end thereof. A corresponding column 120 of the seat 12 is engagingly received in the through positioning hole of the first arm 160. The first sleeve of the first lens barrel 16 and the body of the seat 12 are coaxial.

The second lens barrel 11 is moveably engaged with the columns 120 of the seat 12, and is located between the first lens barrel 16 and the seat 12. The second lens barrel 11 comprises a cylindrical second sleeve (not labeled), and two second lenses 113 equipped in the second sleeve. The two second lenses 113 in the second sleeve are parallel with each other. The second sleeve of the second lens barrel 11 is coaxial with the body of the seat 12. Two opposite second nests 112 are defined in a bottom of the second sleeve. Two magnetic members 15 which can be magnets or magnetic metal sheets or the like are respectively received in the two second nests 112, corresponding to the electromagnets 13 in the first nests 124 of the seat 12. Two opposite second arms 110 extend from a middle portion of a periphery of the second sleeve, and are symmetric about an axis of the second sleeve. Each second arm 110 defines a through hole 1102 adjacent to a distal end thereof, for receiving a corresponding column 120 of the seat 12 therein. The through hole 1102 receives a positioning device 14 therein, and the positioning device 14 is located between the column 120 and the second arm 110. The positioning device 14 comprises a helical spring 141 having an end therein fixed to an inner wall of the second arm 110, and a positioning ball 142 connecting with an opposite end of the spring 141. In the through hole 1102, the ball 142 abuts against the corresponding column 120 of the seat 12.

When electric current is supplied to the electromagnets 13 of the seat 12, the electromagnets 13 activate to provide magnetic force to the magnet member 15 of the second lens barrel 11. The second lens barrel 11 is then moved between the first lens barrel 16 and the seat 12 along the columns 120 of the seat 12 to a certain position according to a direction of the current in the electromagnets 13. When the second lens barrel 11 moves, the ball 142 moves along the sawtooth structure of the corresponding column 120 at a certain position, the ball 142 then enters a corresponding recess 122 of the column 120. The spring 141 is deformed and provides a force to the ball 142 to abut against the column 120 in the through hole 1102. The second lens barrel 16 is thus positioned at the certain position. Therefore, the lens module 10 can focus and capture images with multi-magnifications. At different recesses, the lens module 10 provides different focuses. Consequently, the lens module 10 has multi-step focuses that can provide multi-magnifications of images.

Figure 3:
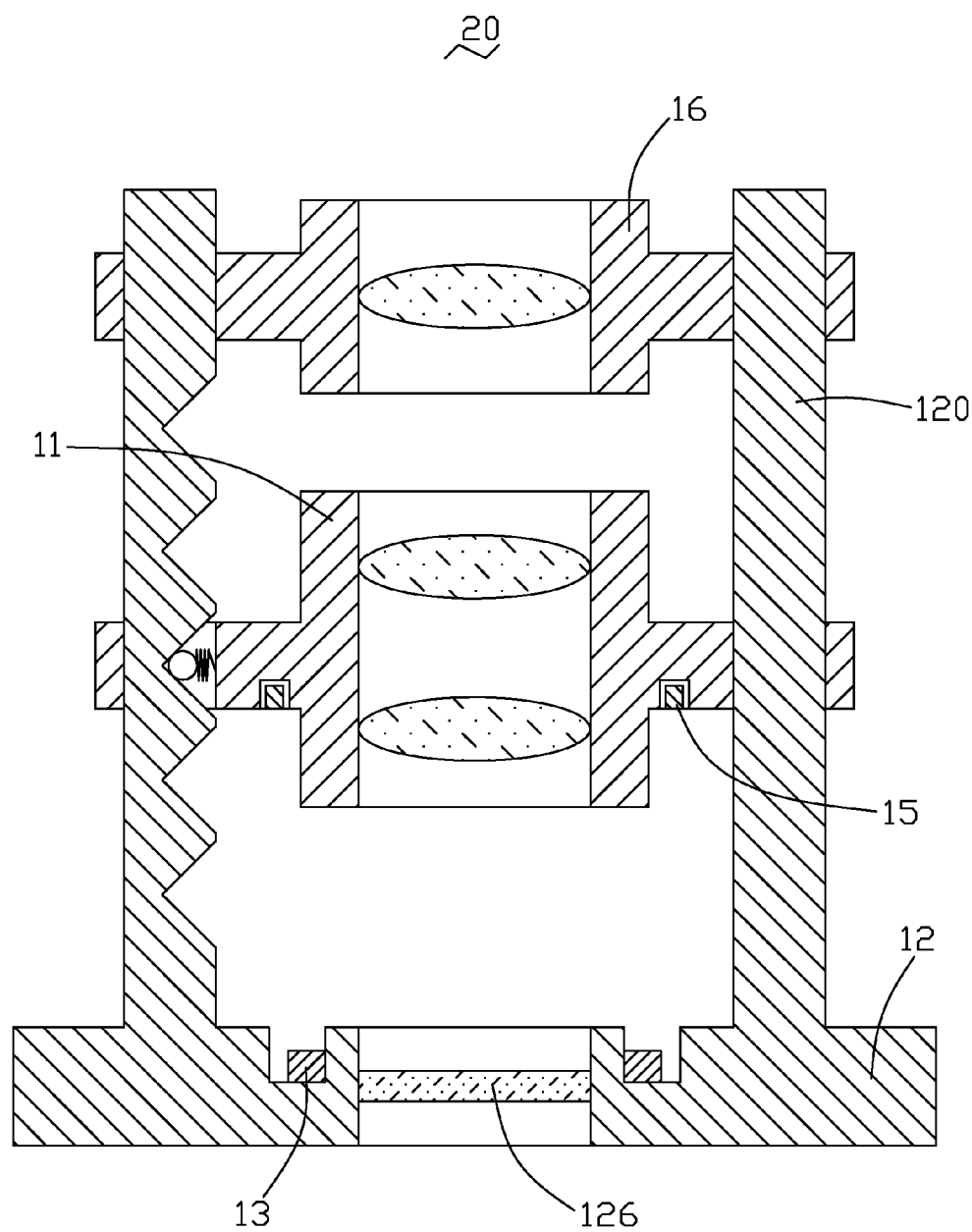
FIG. 3 is a schematic, cross-sectional view of a lens module in accordance with a second embodiment of the present invention.

Referring to FIG. 3, a lens module 20 in accordance with a second embodiment is shown. The lens module 20 of this embodiment has a configuration similar to that of the first embodiment, a difference therebetween is that the two magnetic members 15 of the lens module 20 are respectively equipped to bottoms of the two second arms 110.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens module comprising:
    a seat including a base and a guiding column extending from the base and an electromagnet mounted on the base;
    a first lens barrel comprising a first sleeve with a lens received therein, and a first arm extending from the first sleeve and engaging with the guiding column of the seat; and
    a second lens barrel located between the base and the first lens barrel, the second lens barrel comprising a second sleeve with a lens received therein, and a second arm extending from the second sleeve and movably engaging with the guiding column of the seat, the second lens barrel having a magnetic member corresponding to the electromagnet of the seat; the electromagnet being configured for applying a magnetic force to the magnetic member to drive the second lens barrel to move between the base and the first lens barrel;
    wherein the guiding column of the seat defines a plurality of recesses therein, the recesses are arranged between the first lens barrel and the base, and the second lens barrel is selectively engaged in any one of the recesses;
    the second arm of the second lens barrel connects with a positioning device elastically abutting against the column in the recesses;
    the positioning device comprises a spring that has an end fixed to the second arm of the second lens barrel, and a ball connecting with an opposite end of the spring, the ball abutting against the column of the seat and positioning the second lens barrel at a corresponding recess.

2. The lens module of claim 1, wherein the second arm of the second barrel defines a through hole with the column of the seat extending there through.

3. The lens module of claim 2, wherein the positioning device is received in the through hole of the second arm of the second lens barrel.

4. The lens module of claim 1, wherein the magnetic member is equipped to the second sleeve of the second lens barrel.

5. The lens module of claim 1, wherein the magnetic member is equipped to the second arm of the second lens barrel.

6. The lens module of claim 1, wherein the first sleeve of the first lens barrel, the second sleeve of the second lens barrel and the base of the seat are coaxial.

7. A lens module comprising:
    a seat comprising a base equipped with an electromagnet and two spaced columns extending from the base;
    a first lens barrel comprising a first sleeve located between the two columns of the seat and equipped with a lens therein, and two first arms extending from the sleeve and engaging with the columns, respectively; and
    a second lens barrel equipped with a magnetic member, and comprising a second sleeve located between the two columns of the seat and equipped with a lens therein, and two second arms extending from the second sleeve and movably engaging with the columns of the seat; the electromagnet being configured for applying a magnetic force to the magnetic member to drive the second lens barrel to move between the base and the first lens barrel;
    wherein one of the second arms of the second lens barrel connects with a positioning device elastically abutting against the corresponding column of the seat.

8. The lens module of claim 7, wherein the two first arms of the first lens barrel are symmetrical about an axis of the first sleeve.

9. The lens module of claim 7, wherein the two second arms of the second lens barrel are symmetrical about an axis of the second sleeve.

10. The lens module of claim 7, wherein the base of the seat is equipped with an image sensor corresponding to the lenses of the first lens barrel and the second lens barrel.

11. The lens module of claim 7, wherein the corresponding column of the seat defines a plurality of recesses therein, and the positioning device can be positioned in any one of recesses to position the second lens barrel at different positions between the first lens barrel and the base.

* * * * *